United States Patent
Letizio et al.

(10) Patent No.: US 11,673,532 B2
(45) Date of Patent: Jun. 13, 2023

(54) AUTOMATIC CAMERA WASHER DEACTIVATION

(71) Applicant: Continental Automotive Systems, Inc., Auburn Hills, MI (US)

(72) Inventors: Matthew E. Letizio, Farmington Hills, MI (US); Jason W. Fegan, Sault Sainte Marie, MI (US); Raymond S. Walters, Lake Orion, MI (US)

(73) Assignee: Continental Automotive Systems, Inc., Auburn Hills, MI (US)

( * ) Notice: Subject to any disclaimer, the term of this patent is extended or adjusted under 35 U.S.C. 154(b) by 217 days.

(21) Appl. No.: 16/724,771

(22) Filed: Dec. 23, 2019

(65) Prior Publication Data

US 2021/0188215 A1 Jun. 24, 2021

(51) Int. Cl.
*B60S 1/08* (2006.01)
*B08B 3/02* (2006.01)
*H04N 5/225* (2006.01)

(52) U.S. Cl.
CPC .............. *B60S 1/0848* (2013.01); *B08B 3/02* (2013.01); *H04N 5/2257* (2013.01)

(58) Field of Classification Search
CPC ............. B60S 1/0848; B60S 1/56; B08B 3/02
See application file for complete search history.

(56) References Cited

U.S. PATENT DOCUMENTS

| | | | |
|---|---|---|---|
| 7,162,346 B2 | 1/2007 | Berry et al. | |
| 8,983,717 B2 | 3/2015 | Pupin et al. | |
| 9,180,840 B2 | 11/2015 | Tanaka et al. | |
| 2016/0162740 A1* | 6/2016 | Takemura | G06K 9/00791 348/148 |
| 2017/0320389 A1* | 11/2017 | Burt | B60K 28/165 |
| 2019/0136988 A1 | 5/2019 | Mizuno et al. | |
| 2019/0248340 A1 | 8/2019 | Chen et al. | |
| 2020/0139939 A1* | 5/2020 | Kubota | B60S 1/603 |
| 2020/0207312 A1* | 7/2020 | Kamiya | B60S 1/481 |
| 2021/0001819 A1 | 1/2021 | Kawamura | |

FOREIGN PATENT DOCUMENTS

| | | | |
|---|---|---|---|
| DE | 102018127147 A1 | 5/2019 | |
| JP | H11255018 A | 9/1999 | |
| WO | 2012/138455 A1 | 10/2012 | |
| WO | WO-2014017405 A1 * | 1/2014 | ............... B60R 1/00 |
| WO | 2019/022038 A1 | 1/2019 | |
| WO | 2019/176607 A1 | 9/2019 | |

OTHER PUBLICATIONS

Machine translation: WO2014017405; Ashiduka et al. (Year: 2014).*
International Search Report and Written Opinion dated Apr. 8, 2021 from corresponding International Patent Application No. PCT/US2020/066380.

* cited by examiner

Primary Examiner — Natasha N Campbell

(57) ABSTRACT

A vehicle camera washing system includes a controller configured to control a pump and valve according to a selected mode of operation and a detected blockage of the lens. The selected mode of operation tailors operation of the camera washing system to current vehicle operating conditions to conserve washing fluid.

19 Claims, 2 Drawing Sheets

AUTOMATIC CAMERA WASHER DEACTIVATION

TECHNICAL FIELD

The present disclosure relates to vehicle camera washing systems, and more particularly a camera washing system controlled based vehicle operating mode.

BACKGROUND

Vehicles increasingly include cameras to provide information relating to a surrounding environment. Continual and unimpeded operation of the cameras is required to maintain operation and operation of some vehicle systems. Washing systems are therefore often provided to continually clean vehicle cameras to maintain operability. The amount of washing fluid carried in a vehicle is limited and once exhausted can leave a camera covered and ineffective.

The background description provided herein is for the purpose of generally presenting a context of this disclosure. Work of the presently named inventors, to the extent it is described in this background section, as well as aspects of the description that may not otherwise qualify as prior art at the time of filing, are neither expressly nor impliedly admitted as prior art against the present disclosure.

SUMMARY

A vehicle camera washing system according to an exemplary embodiment of this disclosure, includes, among other possible things a nozzle for directing washer fluid to clean a blockage over a lens of a camera, a washer fluid storage container, a pump for propelling washer fluid through the nozzle, a control valve controlling communication of washer fluid to the nozzle and a controller configured to control the pump and valve according to a selected mode of operation and a detected blockage of the lens.

In a further embodiment of the foregoing vehicle camera washing system, the selected mode of operation comprises an off-road mode, an automatic mode, a time restricted mode and a speed restricted mode.

In a further embodiment of any of the foregoing vehicle camera washing systems, a selector is included that is actuatable by a vehicle operator for selecting one of the selected modes of operation.

In a further embodiment of any of the foregoing vehicle camera washing systems, in the off-road mode, the controller does not actuate the valve to clean the lens in response to a detected blockage of the lens.

In a further embodiment of any of the foregoing vehicle camera washing systems, the controller operates according to the off-road mode in response to detecting a vehicle operating condition that is indicative of operation of the vehicle in an off-road environment.

In a further embodiment of any of the foregoing vehicle camera washing systems, the vehicle operating condition that is indicative of operation of the vehicle in an off-road environment comprises a suspension system being set to an off-road ride height, a four-wheel drive powertrain setting or detected suspension operation that is indicative of operation in an off-road environment.

In a further embodiment of any of the foregoing vehicle camera washing systems, the speed restricted mode comprises the controller discontinuing actuation of the valve to direct washer fluid to clean a blockage over the lens of the camera in response to a vehicle speed being below a threshold value.

In a further embodiment of any of the foregoing vehicle camera washing systems, the controller switches to the speed restricted mode in response to a vehicle operating condition that is indicative of off-road operation in addition to the vehicle speed being below the threshold value.

In a further embodiment of any of the foregoing vehicle camera washing systems, the time restricted mode comprises the controller actuating the valve to direct washer fluid to clean a blockage over the lens of the camera after expiration of a predefined time interval.

In a further embodiment of any of the foregoing vehicle camera washing systems, the camera comprises a plurality of cameras and a corresponding plurality of nozzles, valves and pumps and wherein, the selected mode of operation further comprises selection of a subgroup of the plurality of cameras for cleaning and a subgroup of the plurality of cameras that are not cleaned.

In a further embodiment of any of the foregoing vehicle camera washing systems, the plurality of cameras comprises a front camera, a side camera and a rear camera and the selected subgroup of the plurality of cameras comprises only the front camera and the subgroup of the plurality of cameras that are not cleaned comprises the side camera and the rear camera.

In a further embodiment of any of the foregoing vehicle camera washing systems, the plurality of cameras comprises a front camera, a side camera and a rear camera and the selected subgroup of the plurality of cameras comprises less than all of the front camera, the side camera and the rear camera.

A method of operating a vehicle camera washing system according to an exemplary embodiment of this disclosure, includes, among other possible things, selecting a mode of operation of the camera washing system by actuating a selector, wherein the mode of operation includes one of an off-road mode, an automatic mode, a time restricted mode and a speed restricting mode and actuating a pump and valve with a controller to expel washer fluid from a fluid storage container through a nozzle to direct washer fluid to clean a blockage over a lens of a camera according to the selected mode of operation.

In a further embodiment of the foregoing method of operating a vehicle camera washing system, in the off-road mode, the controller does not actuate the valve to clean the lens in response to a detected blockage of the lens.

In a further embodiment of any of the foregoing methods of operating a vehicle camera washing system, a vehicle operating condition is detected that is indicative of operation of the vehicle in an off-road environment and the controller operates to actuate the valve according to the off-road mode in response to detecting operation of the vehicle in the off-road environment.

In a further embodiment of any of the foregoing methods of operating a vehicle camera washing system, detecting that the vehicle is operating in an off-road environment is indicated in response to a suspension system being set to an off-road ride height, a vehicle powertrain being set to a four-wheel drive setting or detecting operation of a suspension system in a way that is indicative of operation in an off-road environment.

In a further embodiment of any of the foregoing methods of operating a vehicle camera washing system, when in the time restricted mode, the controller actuates the valve to direct washer fluid to clean a blockage over the lens of the camera after expiration of a predefined time interval.

In a further embodiment of any of the foregoing methods in the speed restricted mode, the controller discontinuing actuation of the valve to direct washer fluid to clean a blockage over the lens of the camera in response to a vehicle speed being below a threshold value.

In a further embodiment of any of the foregoing methods of operating a vehicle camera washing system, the camera comprises a plurality of cameras and a corresponding plurality of nozzles and valves and selecting the mode of operation further comprises selecting a subgroup of the plurality of cameras for cleaning and a subgroup of the plurality of cameras that are not cleaned.

In a further embodiment of any of the foregoing methods of operating a vehicle camera washing system, the plurality of cameras comprises a front camera, a side camera and a rear camera and selecting a subgroup of the plurality of cameras that are not cleaned comprises selecting less than all of the front camera, the side camera and the rear camera.

Although the different examples have the specific components shown in the illustrations, embodiments of this disclosure are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
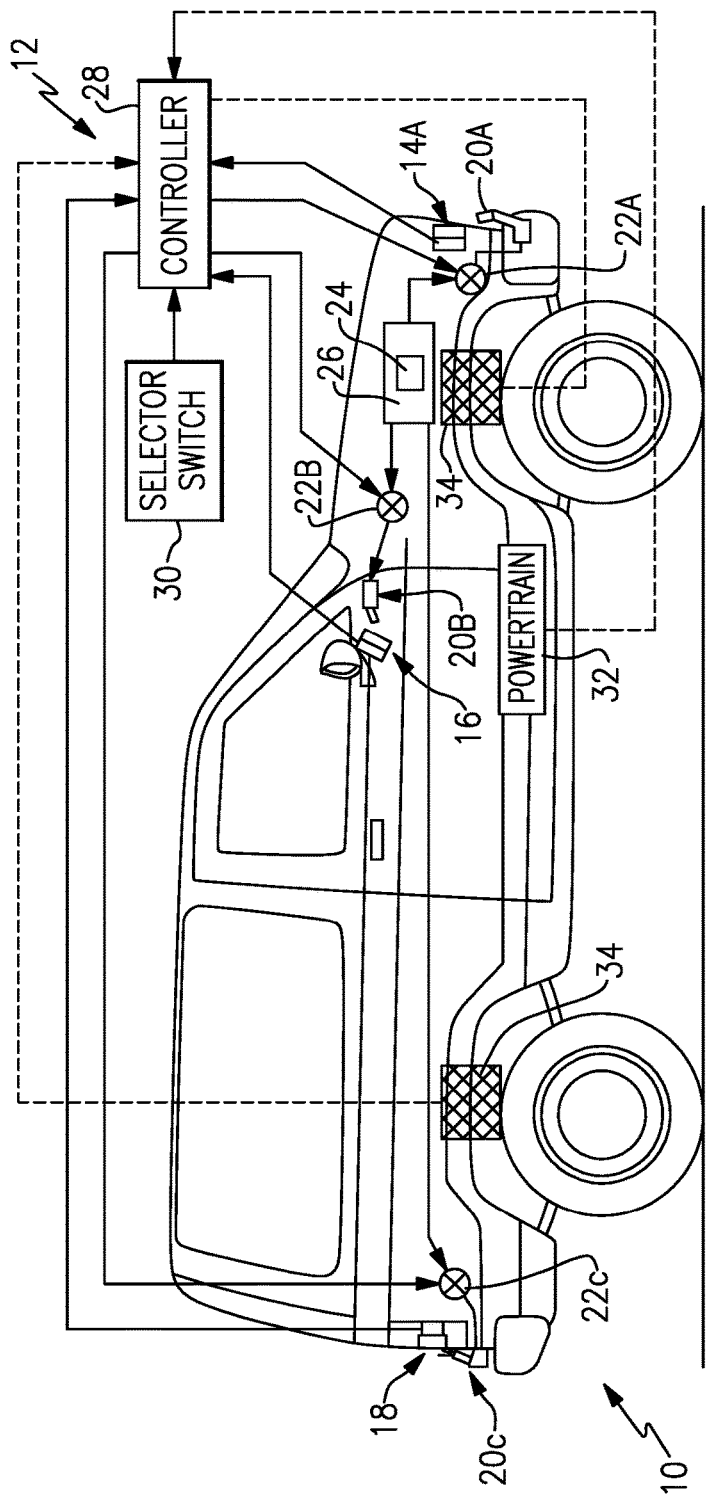
FIG. 1 is a schematic view of a vehicle including an example camera washing system.
Figure 2:
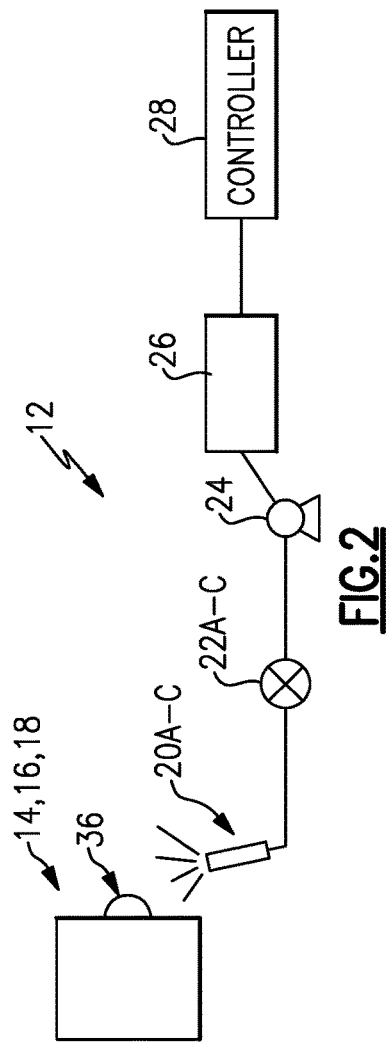
FIG. 2 is a schematic view of an example camera washing system embodiment.

Referring to FIGS. 1 and 2, a vehicle 10 includes cameras 14, 16 and 18 and a camera washing system 12. The camera washing system 12 is controllable to adapt operation to current vehicle operating conditions to conserve washing fluid. The system 12 includes valves 22A-C that are operable to control a flow of washer fluid to a corresponding one of the cameras 14, 16 and 18. At least one pump 24 is provided to generate a flow of washer fluid from a reservoir 26 to each of a plurality of nozzles 20A-C. The nozzles 20A-C are orientated proximate a corresponding one of the cameras 14, 16 and 18. A controller 28 governs operation of the pump 24 and the valves 22A-C to control when and which ones of the cameras 14, 16 and 18 are cleaned.

The system 12 is operable in several different modes that can be identified either by operator selection or automatically based on predefined vehicle operation. In one disclosed example, a mode of operation of the system 12 is determined by an operator input by way of a selector switch 30. The selector switch 30 may be a knob accessible within the vehicle or a selection that is made through an operator control panel such as touch screen display.

The example controller 28 relates to a device and system for performing necessary computing, calculations and control of system devices. The example controller 28 may be specially constructed for the system 12, or it may comprise at least a general-purpose vehicle controller selectively activated and configured by a stored program.

The pump 24 may be one pump as illustrated or a series of pumps distributed at different locations to pressurize and drive washer fluid to a corresponding nozzle 20A-C. The valves 22A-C may be of any controllable valve configuration that provides for selective communication of washer fluid to a corresponding nozzle 20A-C.

In one disclosed example, the vehicle 10 includes a front camera 14, a side camera 16 and a rear camera 18. Each of the cameras 14, 16 and 18 include a lens 36 (FIG. 2). Although only one camera is illustrated for each of the front camera 14, side camera 16 and rear camera 18, it is within the contemplation of this disclosure that more than one camera is disposed at each of the front, side and rear of the vehicle 10. Moreover, it is also within the scope and contemplation of this disclosure that cameras may be located at other locations on the vehicles along with a corresponding nozzle for cleaning.

The controller 28 receives information from each camera 14, 16 and 18 that is utilized to determine if a blockage is present over the lens 36. If a blockage over the lens 36 is detected, the controller 28 will command operation of the system 12 to spray washer fluid to clean the lens 36. In a default mode, the system 12 automatically initiates operation to spray washer fluid and clean the lens 36 upon detection of a blockage. However, in some vehicle operating modes, automatic operation is not desired as little to no benefit is provided and/or it may result in depletion of washer fluid. For example, off-road operation of the vehicle 10 may result in all the cameras continually being exposed to dirt and mud to the point that automatic operation of the system 12 would soon exhaust all washer fluid.

The example system 12 is operable according to a plurality of selectable operating modes tailored to vehicle operating conditions. In one disclosed example, the system 12 is operable according to an automatic mode, a time restricted mode and an off-road mode. In each of the modes, the system 12 will operate to clean the cameras 14, 16 and 18 according to predefined and selected criteria. In the disclosed example, the system 12 is operable to clean the rear camera 18 regardless of which of the operating modes is selected in response to the vehicle being placed in a reverse gear. Cleaning the rear camera 18 when the vehicle is operating in reverse provides the vehicle operator has a clear view of at the rear of the vehicle to enable safe operation.

Figure 3:
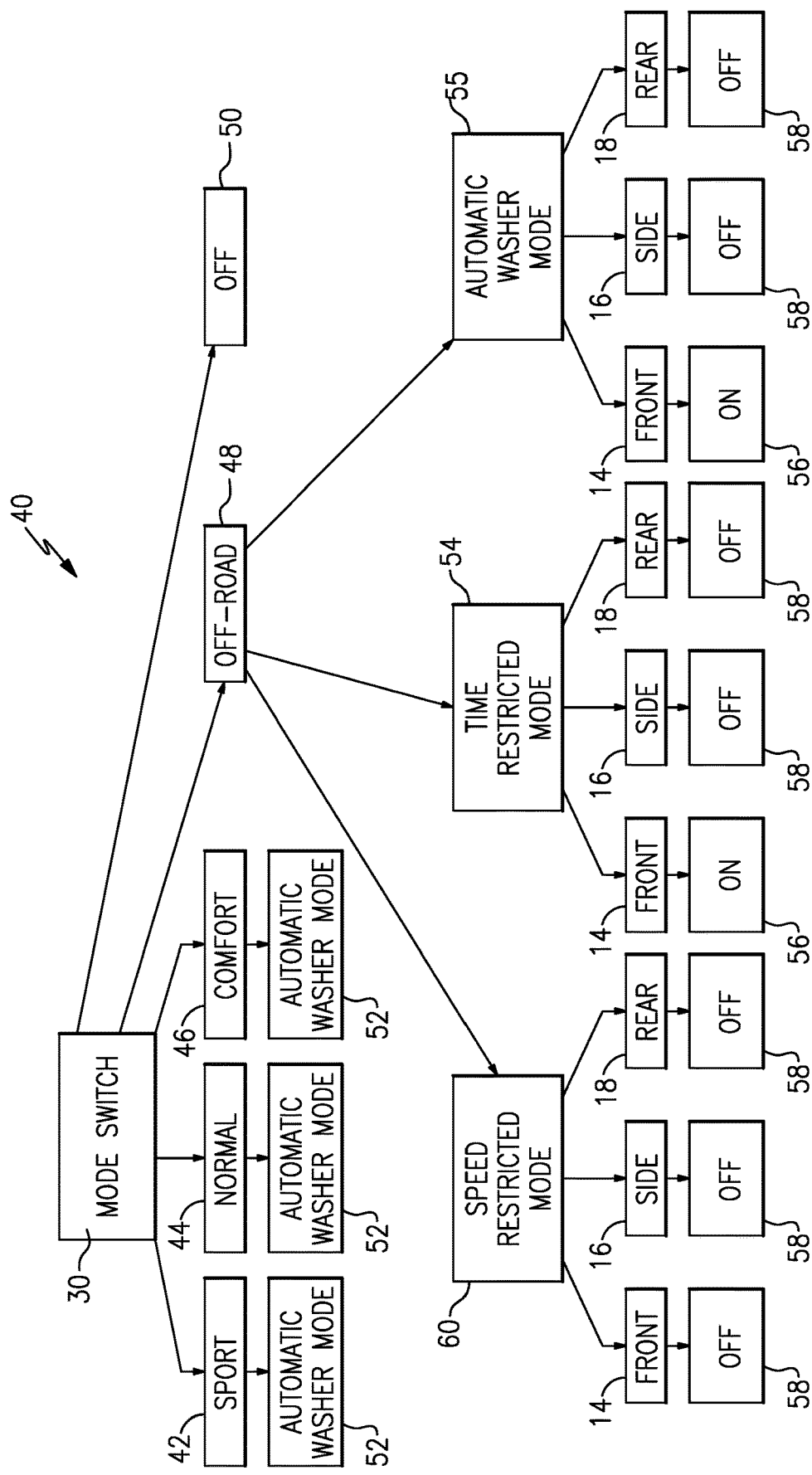
FIG. 3 is a flow diagram illustrating example operating modes of the example camera washing system.

Referring to FIG. 3, with continued reference to FIGS. 1 and 2, one example set of operating modes and settings for the system 12 is schematically shown and indicated at 40. The example settings include a sport setting 42, a normal setting 44, a comfort setting 46 and an off-road mode 48. The system 12 may also be turned off as indicated at 50.

Each of the settings 42, 44, 46 can be selected to an automatic mode as is indicated at 52. In the automatic mode 52, the controller 28 actuates one of the valves 22A-C corresponding to one of the cameras 14, 16 and 18 in response to detection of blockage over the corresponding lens 36. In this example, each of the settings 42, 44 and 46 are shown as operating in the automatic mode 52.

Selection of the off-road mode 48 enables further options to tailor operation of the system 12 to vehicle operation. In this example, the off-road mode 48 may be operated according to a modified automatic mode 55. The modified automatic mode 55 provides for selection of the specific one and/or group of the cameras 14, 16 and 18 that are automatically cleaned responsive to detection of a blockage. In some instances, operation of the front camera 14 may be important, but the side camera 16 and rear camera 18 are not so critical. The example system 12 therefore enables selection of which cameras 14, 16 and 18 are cleaned. In this example, only the front camera 14 is automatically cleaned as is indicated at 56. The side camera 16 and rear camera 18 are turned off as is indicated at 58.

The example off-road mode 48 may also be operated according to a time restricted mode 54. In the time restricted mode 54, the system 12 operates intermittently to clean the selected camera once over a predefined time. For example, the system 12 may be set to wash the front camera 14 once every few minutes if a blockage is detected. Accordingly, the system 12 would detect if a blockage is present and prompt cleaning of the lens 36. The system 12 would then wait the predefined time and again check for a blockage. If a blockage is present, then the lens 36 is cleaned, if no blockage is present, the system remains active and waits another predefined period of time. The time restricted cleaning could be applied to all the cameras 14, 16 and 18 or to a limited group of cameras such as the front camera 14 as indicated. In one disclosed example, the predefined time is 2 minutes. In another disclosed example, the predefined time is 5 minutes.

It should be appreciated, that although only the off-road mode 48 is shown as including optional modes of operation, the sport setting 42, normal setting 44 and comfort setting 46 could be operated according to the modified automatic mode 55 and the time restricted mode 54 within the scope and contemplation of this disclosure.

Additionally, the specific operating mode could be selected automatically based on vehicle operation. In one disclosed example, the system 12 is automatically operable according to the off-road mode 48 in response to detection of a vehicle operating condition that is indicative of operation of the vehicle in an off-road environment. This operation is schematically shown as a speed restricted mode 60. In the speed restricted mode 60, the system 12 will automatically turn off all of the valves 22A-C to prevent cleaning of all of the cameras 14, 16 and 18 in response to indications that the vehicle is operating in an off-road environment.

The vehicle 10 includes suspension system 34, and a powertrain 32, both shown schematically in FIG. 1. Off-road operation may be indicated based on an operator setting the powertrain 32 to four-wheel or all-wheel operation along with a vehicle speed that is below a threshold value. In one disclosed example embodiment, the vehicle speed threshold is less than about 20 kilometers/hour (12 miles/hour). Moreover, off-road operation may be indicated based on setting the suspension system 34 to an off-road ride height. The controller 28 recognizes the setting of the powertrain 32 and/or the suspension system 34 and automatically adjust operation according to the predefined off-road operating mode 48. In this disclosed example, the speed restricted mode 60 is selected.

It should be appreciated, that other vehicle operating settings could also be utilized as an indicator to prompt operation of the system 12 according to a predefined mode. In this example, the predefined mode pertains to off-road operation, however other vehicle operating conditions may be utilized to prompt a specifically tailored operation of the camera washer system 12.

Additionally, the controller 28 may automatically initiate operation of the system 12 based only on sensed vehicle operations. For example, high wheel accelerations, larger than normal vertical wheel movements, vehicle speed and/or sensed vehicle angular orientations that are indicative of operation of a roadway may be predefined to prompt automatic switching of the camera washing system 12 to the off-road mode 48. Moreover, other sensed vehicle operating conditions could be utilized to prompt other operating modes of the system 12 and are within the scope and contemplation of this disclosure.

Accordingly, the disclosed example vehicle camera washing system 12 is operable according to a plurality of operating modes to specifically tailor washing of each of the cameras to vehicle operating conditions.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A method of operating a vehicle camera washing system comprising:
   determining, by a controller, between an on-road and an off-road mode of operation of the camera washing system, wherein the off-road mode of operation includes at least one of an automatic mode, a time restricted mode or a speed restricted mode; and
   selectively actuating a first valve with the controller to expel washer fluid from a fluid storage container through a nozzle to direct washer fluid to clean a blockage over a lens of a first camera according to the determined mode of operation,
   wherein in the off-road mode of operation, the controller does not actuate the first valve to clean the lens of the first camera in response to a detected blockage of the lens, and
   wherein in the on-road mode of operation, the controller actuates the first valve to clean the lens of the first camera in response to the detected blockage of the lens.

2. The method as recited in claim 1, wherein determining the off-road mode of operation comprises detecting a vehicle operating condition that is indicative of operation of the vehicle in an off-road environment and operating the controller to selectivley actuate a second valve to expel washerfluid from the fluid storage container to clean a blockage over a lens of a second camera according to the off-road mode of operation in response to detecting the vehicle operating condition in the off-road environment.

3. The method as recited in claim 2, wherein detecting that the vehicle is operating in the off-road environment is based on a suspension system of the vehicle being set to an off-road ride height, a powertrain of the vehicle being set to a four-wheel drive setting or operation of a suspension system in a way that is indicative of operation in the off-road environment.

4. The method as recited in claim 1, wherein in the time restricted mode, the controller actuates a second valve associated with a second camera to direct washer fluid to clean the blockage over a lens of the second camera after expiration of a predefined time interval while the first valve corresponding to the first camera is not actuated.

5. The method as recited in claim 1, wherein in the speed restricted mode, the controller discontinues actuation of a second valve to direct washer fluid to clean a blockage over a lens of a second camera in response to a vehicle speed being below a threshold value.

6. The method as recited in claim 1, wherein the vehicle camera washing system comprises a plurality of cameras and a corresponding plurality of nozzles and valves, and wherein the method further comprises receiving a user selection of a subgroup of the plurality of cameras for cleaning and a subgroup of the plurality of cameras that are not to be cleaned, the first camera being in the subgrouo of the plurality of cameras that are not to be cleaned.

7. The method as recited in claim 6, wherein the plurality of cameras comprises a front camera, a side camera and a rear camera, and the user selection of the subgroup of the plurality of cameras that are not to be cleaned comprises less than all of the front camera, the side camera and the rear camera.

8. The method of claim 1, wherein determining between the on-road mode of operation and the off-road mode of operation of the camera washing system comprises receiving an operator selection from a selector indicating selection of one of the on-road mode of operation or the off-road mode of operation of the camera washing system.

9. The method of claim 1, wherein the camera washing system comprises a plurality of valves includingthe first valve, a pluralityof cameras including the first camera, each camera having at least one lens and being associated with a distinct valve, and wherein in the time restricted mode, the controller selectively intermittently actuates a second valve associated with a second camera once every predefined time duration to direct washer fluid to clean a blockage over a lens of the second camera following a detection of the blockage on the lens of the second camera, while the first valve is not actuated.

10. A method of operating a vehicle camera washing system comprising:
   determining, by a controller, an off-road mode of operation of the camera washing system from a selector, wherein the off-road mode of operation includes at least one of an automatic mode, a time restricted mode or a speed restricted mode; and
   selectively actuating a valve with the controller to expel washer fluid from a fluid storage container through a nozzle to direct washer fluid to clean a blockage over a lens of a camera according to the determined mode of operation,
   wherein determining the off-road mode of operation comprises detecting a vehicle operating condition that is indicative of operation of the vehicle in an off-road environment, the controller selectively actuates the valve according to the off-road mode in response to detecting operation of the vehicle in the off-road environment, the vehicle operating condition comprising at least one of the vehicle being in a four-wheel or all-wheel drive and vehicle speed being less than a predetermined speed value, vehicle wheel acceleration being greater than a predetermined acceleration value, or vertical vehicle wheel movement being greater than a vertical wheel movement value, and
   wherein each of the automatic mode, the time restricted mode and the speed restricted mode cleans the lens of the camera according to criteria that is distinct relative to criteria correspondingto other of the off-road modes of operation.

11. The method of claim 10, wherein in the off-road mode, the controller does not actuate the valve to clean the lens in response to a detected blockage of the lens.

12. The method of claim 10, wherein the vehicle operating condition comprises the vehicle being in the four-wheel or all-wheel drive and vehicle speed being less than the predetermined speed value.

13. The method of claim 10, wherein the vehicle operating condition comprises vehicle wheel acceleration being greater than the predetermined acceleration value.

14. The method of claim 10, wherein the vehicle operating condition comprises vertical vehicle wheel movement being greater than the vertical wheel movement value.

15. The method of claim 10, wherein the speed restricted mode comprises the controller discontinuing actuation of the valve to prevent washer fluid from cleaning a blockage over the lens of the camera in response to a vehicle speed being below a threshold value.

16. The method of claim 10, wherein the time restricted mode comprises the controller selectively actuating the valve to direct washer fluid to clean a detected blockage over the lens of the camera after expiration of a predefined time interval.

17. A vehicle camera washing system including a nozzle disposed on a vehicle that directs washer fluid to clean a blockage over a lens of a camera mounted on the vehicle, a washerfluid storage container disposed in the vehicle, a pump of the vehicle propelling washerfluid from the washer fluid storage containerthrough the nozzle, a control valve disposed in or on the vehicle controlling communication of washer fluid to the nozzle, and a controller of the vehicle that controls operation of the pump and valve according to a selected mode of operation, the controllerconfigured to perform a method comprising:
   determining an off-road mode of operation of the camera washing system, wherein the off-road mode of operation includes at least one of an automatic mode, a time restricted mode or a speed restricted mode; and
   selectively actuating a valve to expel washerfluid from a fluid storage container through a nozzle to direct washerfluid to clean a blockage over a lens of a camera according to the determined off-road mode of operation,
   wherein determiningthe off-road mode of operation comprises detecting a vehicle operating condition that is indicative of operation of the vehicle in an off-road environment, and the controller selectively actuates the valve according to the off-road mode in response to detecting operation of the vehicle in the off-road environment, the vehicle operating condition comprising at least one of the vehicle being in a four-wheel or all-wheel drive and vehicle speed being lessthan a predetermined speed value, vehiclewheel acceleration being greater than a predetermined acceleration value, or vertical vehicle wheel movement being greater than a vertical wheel movement value, and
   wherein each of the automatic mode, the time restricted mode and the speed restricted mode cleans the lens of the camera according to criteria that is distinct relative to criteria correspondingto other of the off-road modes of operation.

18. The vehicle camera washing system of claim 17, wherein in the off-road mode, the controller does not actuate the valve to clean the lens in response to a detected blockage of the lens.

19. The vehicle camera washing system of claim 17, wherein the speed restricted mode comprises the controller discontinuing actuation of the valve to prevent washer fluid from cleaning a blockage over the lens of the camera in response to a vehicle speed being below a threshold value, and wherein the time restricted mode comprises the controller selectively actuating the valve to direct washer fluid to clean a detected blockage over the lens of the camera after expiration of a predefined time interval.

\* \* \* \* \*